United States Patent
Phillips

(10) Patent No.: US 11,117,096 B2
(45) Date of Patent: Sep. 14, 2021

(54) METHOD AND APPARATUS FOR CLEANING CONTAMINATED GAS IN A REACTOR WITH RUBBER MATERIAL

(71) Applicant: ANUA CLEAN AIR INTERNATIONAL LIMITED, Dublin (IE)

(72) Inventor: John Paul Phillips, Dublin (IE)

(73) Assignee: Anua Clean Air International Limitted, Dublin (IE)

(*) Notice: Subject to any disclaimer, the term of this patent is extended or adjusted under 35 U.S.C. 154(b) by 441 days.

(21) Appl. No.: 15/780,806

(22) PCT Filed: Dec. 5, 2016

(86) PCT No.: PCT/EP2016/079792
§ 371 (c)(1),
(2) Date: Jun. 1, 2018

(87) PCT Pub. No.: WO2017/093573
PCT Pub. Date: Jun. 8, 2017

(65) Prior Publication Data
US 2019/0184337 A1      Jun. 20, 2019

(30) Foreign Application Priority Data

Dec. 3, 2015   (EP) .................................. 15197886

(51) Int. Cl.
*B01D 53/14* (2006.01)
*B01D 53/84* (2006.01)
*C10L 3/10* (2006.01)

(52) U.S. Cl.
CPC .............. *B01D 53/84* (2013.01); *C10L 3/101* (2013.01); *C10L 3/103* (2013.01); *B01D 2251/404* (2013.01); *B01D 2251/606* (2013.01); *B01D 2251/95* (2013.01); *B01D 2256/245* (2013.01); *B01D 2257/304* (2013.01); *B01D 2257/306* (2013.01); *B01D 2257/55* (2013.01); *B01D 2257/708* (2013.01); *B01D 2258/05* (2013.01); *B01D 2258/06* (2013.01);
(Continued)

(58) Field of Classification Search
CPC ...... B01D 2247/00–14; B01D 2101/00; B01D 53/14–1493; B01D 53/18–185
See application file for complete search history.

(56) References Cited

U.S. PATENT DOCUMENTS 6,019,810 A * 2/2000 Phillips .................. B01D 53/84
55/512

FOREIGN PATENT DOCUMENTS

| EP | 1938886 | 2/2008 | |
| EP | 1938886 A1 * | 7/2008 | ............... C01B 3/50 |
| WO | 00/03789 | 1/2000 | |

(Continued)

OTHER PUBLICATIONS

International Search Report and Written Opinion for PCT/EP2016-079792 dated Jun. 8, 2017.

*Primary Examiner* — Cabrena Holecek
(74) *Attorney, Agent, or Firm* — Chalker Flores, LLP; Daniel J. Chalker

(57) ABSTRACT

A method and apparatus for cleaning a contaminated gas, the method comprising passing the contaminated gas through at least two cleaning stages of rubber material through which water flows, wherein the gas and the water pass cocurrently though the at least two stages of rubber material.

14 Claims, 1 Drawing Sheet

(52) U.S. Cl.
CPC ......... *B01D 2259/124* (2013.01); *Y02A 50/20* (2018.01); *Y02E 50/30* (2013.01)

(56) References Cited

FOREIGN PATENT DOCUMENTS

| | | | | |
|---|---|---|---|---|
| WO | WO-0003789 A1 * | 1/2000 | ............. | B01D 53/34 |
| WO | 02/089959 | 11/2002 | | |
| WO | WO-02089959 A1 * | 11/2002 | ............. | B01D 53/84 |

* cited by examiner

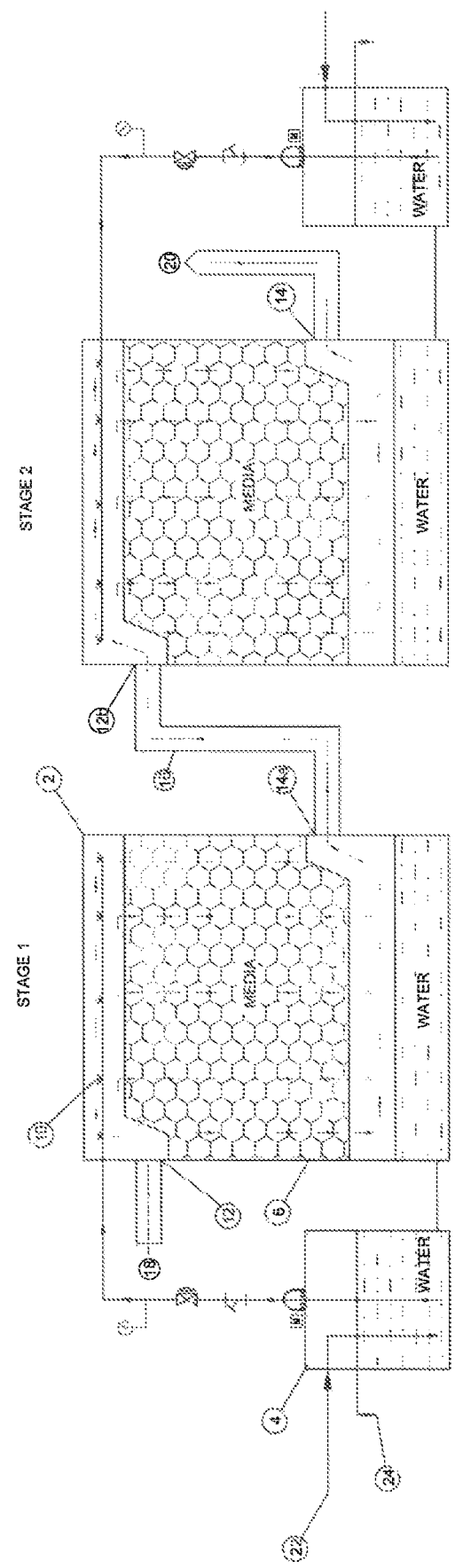

METHOD AND APPARATUS FOR CLEANING CONTAMINATED GAS IN A REACTOR WITH RUBBER MATERIAL

FIELD OF THE INVENTION

This invention relates to a method and apparatus for cleaning contaminated gas such as landfill gas, mine gas, biogas or syn gas. Syn gas can be manufactured from pyrolysis, gasification or torification of solid organic materials.

BACKGROUND TO THE INVENTION

The invention relates to cleaning contaminated gas such as landfill gas, mine gas or biogas. Such gases are typically anaerobic, with oxygen levels between 5% and 1.3% or less. Examples of contaminants of such gases include hydrogen sulphide ($H_2S$) and volatile siloxanes, and it is known to remove these contaminants from a landfill gas using chemical scrubbers and activated carbon. However such known systems are not effective with high concentrations of hydrogen sulphide ($H_2S$) and siloxanes. Such systems also suffer from the problem that the chemical scrubbers and activated carbon are expensive, and that disposal of secondary waste streams are also expensive.

Used tyre rubber is another known alternative for treating contaminant air streams. WO0003789 (A1) discloses a process and apparatus for the treatment of contaminant air streams such as from public sewage plants. The process involves passing a contaminated air stream through a filter comprising a bed of used vehicle tyres in a contacting zone. The tyres are cut into a suitable size and are kept moist by a spray nozzle. This system was suitable for removing sulphurous gases without the use of additional chemicals, however the system, which relies on physical cleaning only, is not effective with high concentrations of hydrogen sulphide ($H_2S$) and siloxanes. This prior art system is also disadvantageous as the air stream flows in a contraflow to the water used to moisten the tyre material. This system uses a fine mist of water, the volume of which is limited by the contraflow system.

There is therefore a need for an improved method of cleaning such gases which overcomes these problems, and which is suitable for cleaning a contaminated gas having a high concentration of contaminants. One aim of the invention is to provide a method of cleaning which is effective on gas having a hydrogen sulphide ($H_2S$) concentration greater than 500 ppm, and preferably still effective on gas having a hydrogen sulphide ($H_2S$) concentration greater than 3500 ppm.

SUMMARY OF THE INVENTION

The present invention provides a method of cleaning a contaminated gas, the method comprising passing the contaminated gas through at least two cleaning stages of rubber material through which water flows, wherein the gas and the water pass cocurrently though the at least two stages of rubber material.

Passing the contaminated gas through the rubber material facilitates a chemical and/or catalytic reaction between the rubber material and the contaminated gas to remove sulphur from the gas. The rubber is preferably crumb rubber and may be granulated or shredded into pieces. Such rubber material is widely available and inexpensive, for example from used vehicle tyres. As the crumb rubber material is inert, the crumb rubber material offers an almost indefinite media life.

A co-current flow between the water and the gas facilitates a high irrigation rate with a low pressure drop. It is possible to increase the irrigation rate much higher than that of the fine water mist used in prior art rubber filtration systems. Preferably a flow rate in the region of 15-20 $L/m^2$/minute is achieved, in comparison with less than 5 $L/m^2$/minute used in the prior art. The cocurrent flow of the water and gas is essential to achieve these rates.

The method may further comprise recirculating the water. The method may further comprise purging the irrigation water to remove contaminants. Preferably the water is heated. Preferably the water comprises a biological agent. Preferably the method further comprises monitoring the pH of the system. Preferably the method further comprises discharging an exhaust contaminant.

The invention further provides an apparatus for cleaning a contaminated gas, the apparatus comprising: at least two cleaning stages of rubber material; means for irrigating the rubber material with water; means for passing the contaminated gas through the at least two stages of rubber material; wherein the means for irrigating the rubber material with water and the means for passing the contaminated gas through the at least two stages of rubber material are arranged to enable the gas and the water to pass cocurrently though the at least two stages of rubber material.

Preferably each cleaning stage further comprises a primary tank for housing the rubber material. Preferably each cleaning stage further comprises a reservoir tank for storing the irrigation water.

Preferably each primary tank comprises a gas inlet port and a gas outlet port, wherein the gas outlet port is lower than the gas inlet port. Preferably the gas outlet port of at least one primary tank is in fluid communication with the gas inlet port of the primary tank of the subsequent cleaning stage. The means for irrigating the rubber material with water may comprise at least one spray nozzle which may be positioned above the rubber material. Preferably means are provided for recirculating the water. Preferably means are provided for purging the irrigation water to remove contaminants Preferably the water is heated. The supply water may be heated. Alternatively or additionally, heater means may be provided within one of the tanks to heat the irrigation water. Preferably the water comprises a biological agent. Preferably the apparatus further comprises means for monitoring the pH of the system. Preferably the apparatus further comprises means for discharging an exhaust contaminant The exhaust contaminant may comprise a sulphate. Means may also be provided to deoxygenate the water in the reservoir.

The method may further comprise passing the contaminated gas through a further cleaning stage containing marine shell material. This may be particularly beneficial when cleaning biogas.

The method may further comprise the step of refreshing the marine shell material by applying a refreshing material to the cleaning element. The refreshing material may comprise sodium bicarbonate. The marine shell material may comprise comprises mussels shell material, and/or oyster shell material, and/or cockles shell material, and/or American quahogs shell material, and/or queen scallops shell material.

There is further provided a landfill gas engine comprising an apparatus for cleaning a contaminated gas as described above.

There is further provided a computer-readable medium having computer-executable instructions adapted to cause a computer system to perform the method as described above.

The contaminated gas may comprise an anaerobic gas. The contaminated gas may comprise less than 5% oxygen, or even less than 1.3% oxygen. The contaminated gas may comprise a biogas or biomethane, or synthetic gas produced by gasification of wood or biomass from waste streams. The contaminated gas may comprise a landfill gas. The contaminated gas may comprise a mine gas, containing methane for example. The present invention may be used to clean biogas from sources including sludges from wastewater treatment, food waste, agricultural waste, the biogas typically including methane, carbon dioxide and other contaminants including Silica.

BRIEF DESCRIPTION OF THE DRAWINGS

The invention will be more clearly understood from the following description of an embodiment thereof, given by way of example only, with reference to the accompanying drawings, in which:

FIG. 1 is an apparatus for cleaning a contaminated gas according to one embodiment of the invention.

DETAILED DESCRIPTION

Referring to the drawings there is illustrated an apparatus for cleaning a contaminated gas, according to one embodiment of the invention.

The apparatus is suitable for cleaning a variety of different types of contaminated gas. For example the apparatus may be employed to clean a contaminated gas, such as an anaerobic gas having less than 1.3% oxygen, and/or a biogas, and/or a landfill gas, and/or a mine gas. Landfill gas (LFG) is a bi-product of the degradation of organic material in landfill and is produced under anaerobic condition. In undiluted form, LFG consists primarily of the components methane and carbon dioxide. LFG may also include the presence of other compounds such as hydrogen sulphide and siloxanes. The apparatus may be used as part of a landfill gas engine to clean a landfill gas.

The apparatus requires at least two cleaning stages. The multiple passes improve the efficiency of the cleaning process. In this embodiment, two cleaning stages are provided, however a greater number of stages could be used in series.

Each cleaning stage comprises a primary tank 2 and a secondary tank 4. The primary tank of each of the two stages houses crumb rubber material 6, only a portion of which is shown in FIG. 1 for clarity. The primary tank of each cleaning stage has an inlet port 12 and an outlet port 14. Contaminated gas is introduced through the inlet port of each tank and cleaned gas exits through the outlet port. The outlet port 14a of the primary tank of the first cleaning stage is in gas communication with the inlet port 12b of the primary tank of the second cleaning stage, permitting a two stage cleaning process. A duct 16 is shown in this embodiment, linking the outlet of the first tank with the inlet of the second. The cleaned gas 20 exits through the outlet port of the primary tank of the final cleaning stage. From there it may proceed to a gas engine for example.

Passing the contaminated gas through the crumb rubber material facilitates a chemical and/or catalytic reaction between the crumb rubber material and the contaminated gas to remove sulphur from the gas. The crumb rubber may be granulated or shredded into small pieces. The primary tank has a support plate/floor for supporting the crumb rubber material, the support plate being gas and water permeable.

The secondary tank 4 acts as a reservoir to store water, and is in fluid communication with a plurality of spray nozzles 10 in the primary tank. The spray nozzles 10 are provided to spray water onto the crumb rubber material to irrigate it. The water is recirculated for continued use after it passed through the crumb rubber material. The reservoir tank 4 has a supply water inlet 22 and a purge water outlet 24. The supply water may be heated. Alternatively or additionally, heater means may be provided within one of the tanks to heat the irrigation water. Means may also be provided to oxygenate the water in the reservoir.

It will been seen from FIG. 1 that the gas to be treated 18 and the irrigation water are each introduced at the top of the tank, and thus flow in the same direction in a co-current flow arrangement. A co-current flow between the water and the gas facilitates a high irrigation rate with a low pressure drop. It is possible to increase the irrigation rate much higher than that of the fine water mist used in prior art rubber filtration systems. Preferably a flow rate in the region of 15-20 $L/m^2$/minute is achieved, in comparison with less than 5 $L/m^2$/minute used in the prior art. The cocurrent flow of the water and gas is essential to achieve these rates.

A biological agent, an inoculant, may be introduced into the irrigation water, such as a facultative autotrophic sulphur reducing bacteria. By adding a biological component to the water, a bioreaction takes place in the water and the crumb rubber is inoculated with facultative autotrophic sulphur reducing bacteria.

Biological activity is optimum between 25 and 35 degrees Celsius, with a doubling of biological activity for every ten degree rise. Maintaining optimum temperature gives significant performance benefits and so it is therefore beneficial for the reactions to take place in the presence of heat.

Preheating the gas stream is generally not feasible because of very high energy loads and associated costs. According to one aspect of the invention, water is continuously recirculated so heating the water used to irrigate the filter material is a much cheaper and lower cost option. To further reduce running costs the fresh water being introduced into the system can be preheated using water being released from the system through an indirect heat exchanger.

After passing through the crumb rubber, hydrogen sulphide is converted via a biological process to sulphate (sulphuric acid), some of which is flushed from the crumb rubber by the irrigation water. It may be desirable to provide means for purging the irrigation water to remove contaminants such as sulphuric acid from the reactor.

Water usage is a significant in terms of cost for providing and disposing of water. Means for controlling the purge of water is therefore beneficial. If this can be minimised it can provide significant saving in running cost. To minimise water usage and running cost the system can operate at a very low pH (down as low as 2). Means may be provided to automatically monitor pH within the system and control purging of water from the system to maintain pH levels above pH 2. Furthermore, each primary tank has an exhaust port for discharging exhaust contaminants, such as sulphates.

A second spray nozzle may be used to apply a refreshing material, such as sodium bicarbonate (aerated salts), to the rubber material to refresh the rubber material while the contaminated gas is being passed through it. This enables re-generating and cleaning of the rubber material without stopping the process and removing rubber material. Sodium bicarbonate may be used to clean the rubber material. The invention may provide in-situ cleaning with the sodium bicarbonate where the rubber material may be cleaned without removing and re-inoculation. The aerated salts don't interfere/kill the biological process or remove any biological growth. Aerated salts cleaning is particularly useful when $H_2S$ levels are higher, and Oxygen is lower as there is less conversion to sulphate. The alternative would be to physically remove the media and put the media into a dedicated cleaning process or to replace the media.

The combination of the above measures allows for smaller more efficient filters to be installed with improved performance and reduced running costs.

A third stage may be added to the system, containing marine shell material. This could be beneficial for cleaning highly contaminated gas. Marine shell media has an attraction for sulphur. The marine shell material achieves biological inoculation of the contaminated gas with its sulphur degrading bacteria. With this third stage the invention offers the potential to biologically treat volatile siloxanes and other VOCs such as organic sulphides which may be undesirable.

The marine shell material may be mussels shell material, and/or oyster shell material, and/or cockles shell material, and/or American quahogs shell material, and and/or queen scallops shell material. Quahogs are US clam shells commonly found along the eastern seaboard of USA.

By passing the contaminated gas through the marine shell material in a primary tank of a third cleaning stage, the apparatus facilitates a biological reaction between the marine shell material and the contaminated gas.

The apparatus can therefore provide multi-stage crumb rubber cleaning combined with shell cleaning technology. The three pass process is particularly suitable for cleaning a biogas/landfill gas. The passage of the biogas through the system is exposed to the sulphur degrading bacteria which are retained in the reactor. The marine shell stage of the multi-staging acts as a final polishing stage. The biological treatment of the $H_2S$ results in the production of sulphate which is purged from the system by bleeding of a percentage of the recirculation water. The apparatus operates by means of a combination of physical adsorption and chemisorption. The chemical and/or catalytic reactions and the biological reaction act to remove contaminants from the contaminated gas.

There is a marked improvement in performance with the invention over prior art systems, such as that described in WO0003798. The removal performance has improved from 30 to 70% removal with corresponding increase in elimination capacities. This result can be achieved by:

1. Increasing the irrigation rate to greater than 15 $L/m^2/min$.
2. Operating system with gas and water flowing in the same direction in a co-current flow arrangement (this facilitates increased irrigation with a low pressure drop).
3. Successful inoculation with facultative autotrophic sulphur reducing bacteria.

It is also possible for the system to operate on permeate (treated contaminated water) from a reverse ionization process on site which is used to reduce contaminates from landfill leachate. The significance of this is that it lowers (eliminates) the running cost associated with supplying and purging water from the plant. In terms of running cost this is the major cost. Because of the high H2S and need to minimize water usage the pH of recirculating water is very low (1.5 to 2) this means very expensive heating elements are required, preheating the permeate is a cost effective way of maintain optimum temperatures. The combined removal of $H_2S$ and siloxane coupled with the use of permeate adds significant potential value to the process. Siloxane removal adds value as it reduces the requirement for removal of volatile siloxanes by activated carbon which is very expensive.

Analysis of engine oil in a tested the gas cleaning plant in accordance with the present invention demonstrates an average reduction in silicon in the engine oil of circa 66%. Analysis of the residue on the surface of the media demonstrates the presence of siloxane.

The invention is not limited to the embodiment hereinbefore described, with reference to the accompanying drawings, which may be varied in construction and detail. It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The words "comprises/comprising" and the words "having/including" when used herein with reference to the present invention are used to specify the presence of stated features, integers, steps or components but does not preclude the presence or addition of one or more other features, integers, steps, components or groups thereof.

The invention claimed is:

1. A method of cleaning a contaminated gas, the method comprising passing the contaminated gas through at least two cleaning stages of crumb rubber through which water flows, wherein the gas and the water pass cocurrently through the at least two cleaning stages of crumb rubber at an irrigation water flow rate greater than 15 $L/m^2$/minute, and wherein the crumb rubber is inoculated with a biological agent.

2. The method of claim 1, further comprising the step of recirculating the water through the crumb rubber.

3. The method of claim 1, wherein the water is heated.

4. The method of claim 1, wherein the water comprises the biological agent.

5. The method of claim 1, further comprising passing the contaminated gas through a further cleaning stage containing marine shell material.

6. An apparatus for cleaning a contaminated gas, the apparatus comprising:
at least two cleaning stages of crumb rubber, wherein the crumb rubber is inoculated with a biological agent;
means for irrigating the crumb rubber with water at an irrigation water flow rate greater than 15 $L/m^2$/minute;
means for passing the contaminated gas through the at least two cleaning stages of crumb rubber; and
wherein the means for irrigating the crumb rubber with water and the means for passing the contaminated gas through the at least two stages of crumb rubber are arranged to enable the gas and the water to pass cocurrently through the at least two stages of crumb rubber.

7. The apparatus of claim 6, each cleaning stage further comprising a reservoir tank for storing the irrigation water.

8. The apparatus of claim 6, wherein the means for irrigating the crumb rubber with water comprises at least one spray nozzle above the crumb rubber.

9. The apparatus of claim 6, further comprising means for monitoring the pH of the system.

10. The apparatus of claim 6, further comprising means for discharging an exhaust contaminant.

11. The apparatus of claim 6, each cleaning stage further comprising a primary tank for housing the crumb rubber.

12. The apparatus of claim 11, wherein each primary tank comprise a gas inlet port and a gas outlet port, wherein the gas outlet port is lower than the gas inlet port.

13. A landfill gas engine comprising an apparatus for cleaning a contaminated gas comprising:

at least two cleaning stages of crumb rubber, wherein the crumb rubber is inoculated with a biological agent;

means for irrigating the crumb rubber with water at an irrigation water flow rate greater than 15 L/$m^2$/minute;

means for passing the contaminated gas through the at least two cleaning stages of crumb rubber; and wherein the means for irrigating the crumb rubber with water and the means for passing the contaminated gas through the at least two cleaning stages of crumb rubber are arranged to enable the gas and the water to pass cocurrently through the at least two cleaning stages of crumb rubber.

14. A non-transitory computer-readable medium having computer-executable instructions adapted to cause a computer system to perform a step of passing a contaminated gas through at least two cleaning stages of crumb rubber through which water flows at an irrigation water flow rate greater than 15 L/$m^2$/minute, wherein the crumb rubber is inoculated with a biological agent, and wherein the gas and the water pass cocurrently through the at least two cleaning stages of crumb rubber.

* * * * *